United States Patent [19]
Hughes

[11] Patent Number: 6,096,197
[45] Date of Patent: Aug. 1, 2000

[54] SHOWER FILTER FOR CHLORINE REMOVAL AND SCALE DEPOSIT PREVENTION

[76] Inventor: Douglass E. Hughes, 3835 Northbrook Dr. Unit E, Boulder, Colo. 80304

[21] Appl. No.: 08/988,866

[22] Filed: Dec. 11, 1997

[51] Int. Cl.[7] .................................................. B01D 35/04
[52] U.S. Cl. .......................... 210/94; 210/232; 210/266; 210/282; 210/443; 210/449; 210/460; 4/615
[58] Field of Search ............................... 210/85, 94, 232, 210/266, 282, 449, 460, 696, 697, 440, 443; 4/615; 137/801

[56] References Cited

U.S. PATENT DOCUMENTS

| | | | |
|---|---|---|---|
| 2,582,388 | 1/1952 | Mansfield | 210/449 |
| 3,469,696 | 9/1969 | Petrucci et al. | 210/697 |
| 3,853,761 | 12/1974 | McClory | 210/449 |
| 4,686,037 | 8/1987 | Lang | 210/449 |
| 4,753,728 | 6/1988 | Vanderbilt et al. | 210/282 |
| 4,770,768 | 9/1988 | Lang | 210/94 |
| 5,008,011 | 4/1991 | Underwood | 210/449 |
| 5,108,709 | 4/1992 | Bugar et al. | 210/94 |
| 5,114,570 | 5/1992 | Nelson et al. | 210/94 |
| 5,137,657 | 8/1992 | Boffardi | 210/697 |
| 5,152,464 | 10/1992 | Farley | 210/449 |
| 5,213,688 | 5/1993 | Robinson | 210/440 |
| 5,545,314 | 8/1996 | Parise et al. | 210/449 |
| 5,653,868 | 8/1997 | Yanou et al. | 210/460 |
| 5,795,471 | 8/1998 | Naito | 210/449 |

Primary Examiner—Joseph W. Drodge
Attorney, Agent, or Firm—Steven C. Petersen; Chrisman, Bynum & Johnson

[57] ABSTRACT

Embodiments of a multi-purpose shower/tub filter unit are shown and described, the filter unit containing a chlorine-removal media and a scale-inhibiting media. The housing of the filter unit is adapted to attach universally to various water sources, such as a pipe or faucet and to a showerhead or hand-held spray unit. The filter unit preferably has an arm extending out from the main body of the filter unit, and the filter unit preferably extends upward and outward from the attachment point on the pipe or faucet. This way, a single filter unit may either be positioned a) substantially above a shower pipe to place the showerhead generally at a similar level as it would be without the filter unit in place, as in a United States shower configuration; or b) to fit under but extend out from a tub faucet, as in a European shower configuration. The filter unit has a replaceable cartridge that includes a carbon block and scale-deposit-inhibiting phosphate spheres contained in a space inside the carbon block. The filter unit housing is designed to be opened by hand for easy replacement of the filter cartridge and to have seals between two portions of the housing and between the filter cartridge and the housing which are held securely in place and are, therefore, not prone to damage during cartridge change-out. The filter cartridge is designed to be symmetrical and bi-directional, in that it can be inserted into the filter housing with either end in an upward orientation, to make installation trouble-free. Connections to plumbing, showerheads, and hand-held sprayers may be adapted to a wide variety of baths/shower around the world, by threading changes or by couplers or showerheads designed for particular configurations.

17 Claims, 4 Drawing Sheets

SHOWER FILTER FOR CHLORINE REMOVAL AND SCALE DEPOSIT PREVENTION

BACKGROUND OF THE INVENTION

1. Field of the Invention

This invention relates generally to filters for purifying or treating shower water. More specifically, this invention relates to a shower filter that removes chlorine and also treats components that cause scaling in the shower environment.

2. Related Art

Over the past ten years North American consumers in particular have become aware of problems with their municipally-treated tap water. Specifically, there is growing concern about chlorine in tap water. Studies now have shown that chlorine, in contact with organics, forms trihalomethanes (THMs), which in turn are responsible for some cancers in humans. As the awareness of the problem of chlorinated water grows, consumers seek remedies. At the kitchen tap, these remedies are manifested in the purchase of bottled water, the growing popularity of carafes that de-chlorinate water, and end-of-tap and under-counter devices that de-chlorinate water.

Studies are now beginning to show that humans can consume large amounts of chlorine in the shower. Chlorine by nature is a gas, and in the form of a hot water spray such as a shower, the chlorine is highly unstable and almost instantly coverts to a gas. The person taking a shower then inhales this chlorine gas. One study asserts that chlorine inhaled in one shower is equivalent to drinking 50 gallons of chlorinated tap water. It is not known how harmful the inhalation of this chlorine gas can be. Whereas twenty years ago there was no evidence that chlorinated tap water was carcinogenic, today it is proven and accepted. Thus, there is a grave concern among the health-conscious consumers that the in-take of any chlorine in any form could be harmful.

Another problem with shower water is scale in the water, also known as "hard water". Scale or hard water are layman's terms for the presence of calcium and magnesium. These two common ingredients are present in 75% of all American household tap water. Scale is harmless to our health, but aesthetically unpleasing. Typically, hard water or scale forms a white crust around the spray holes in the showerhead, causing the showerhead to degrade over time. The scale is also unsightly when it sticks to surfaces such as shower walls or doors. Even ceramic tile is not immune to the build-up of scale. Scale is a particular problem on walls since it provides a surface area for the growth of bacteria. The combination of a moist environment and the rough surface of a scaley tiled wall is perfect for bacteria and algae growth. Today most bathroom cleansers will assert that they attack or remove scale deposits as well as clean, but these remedies are only partially effective.

Another problem with designing products for the bathroom, especially the tub/shower area, is that the configuration accepted as standard in the United States differs greatly from the configurations in the rest of the world. In Canada, Asia and Europe, the connection for the showerhead is down at the tub faucet instead of six feet higher as in the United States.

In the past, shower filters have been made that feature coarse granular carbon for chlorine removal. Carbon block has been used in radial flow for chlorine removal, but the carbon block core has been left empty and used solely for conducting water.

Therefore, there is still a need for a device that effectively removes chlorine from shower or bath water, and that also treats the components of the water stream that cause scale deposits. There is a need for an economical shower filter device that can be adapted to the wide variety of plumbing and shower configurations that are used in the world.

SUMMARY OF THE INVENTION

This invention comprises a dual-purpose shower and bath filter designed to reduce chlorine in shower water through absorption, reduce or eliminate scale deposits, and fit easily in both U.S. and European-style bathroom plumbing configurations. The invented device features a design that keeps the filter unit from significantly lowering the level of the showerhead, that is, the distance of the showerhead from the shower or bath floor. An additional feature is that the device includes an easily-replaceable filter for quick, tool-free filter change-outs. An additional feature of the invention is that the mesh size of the activated carbon powder may be configured to accommodate differing water pressures.

DESCRIPTION OF THE PREFERRED EMBODIMENTS

The preferred shower filter accomplishes at least three main water treatment and design objectives. The dual-action of the invented filter unit enables a single device to simultaneously prevent scale deposits from forming on plumbing and wall surfaces while also reducing or eliminating the potential health hazard of chlorine from shower spray. First, the filter cartridge accomplishes the scale-reduction or -prevention by treating water with a specially-designed phosphate that coats scale (comprising calcium and magnesium) so that it will not stick to plumbing or wall surfaces. Second, the filter cartridge accomplishes the reduction or elimination of chlorine in the water through the absorption capabilities of a super-fine mesh powdered activated carbon, formed into a carbon block. Third, the filter unit accomplishes a universality objective in that it is designed to fit both U.S. and European-style configurations for bathroom shower/tub units. While being designed to fit under the faucet of a European-style bath/shower, the filter unit design, when placed in a U.S. shower configuration, keeps the filter housing up and behind the showerhead and substantially above the original location of the showerhead. Thus, the presence of the filter in a U.S. configuration does not noticeably lower the showerhead from its original position, and thereby accommodates taller persons and preserves, in general, the location, direction and pattern of the user's original shower spray.

Figure 1:
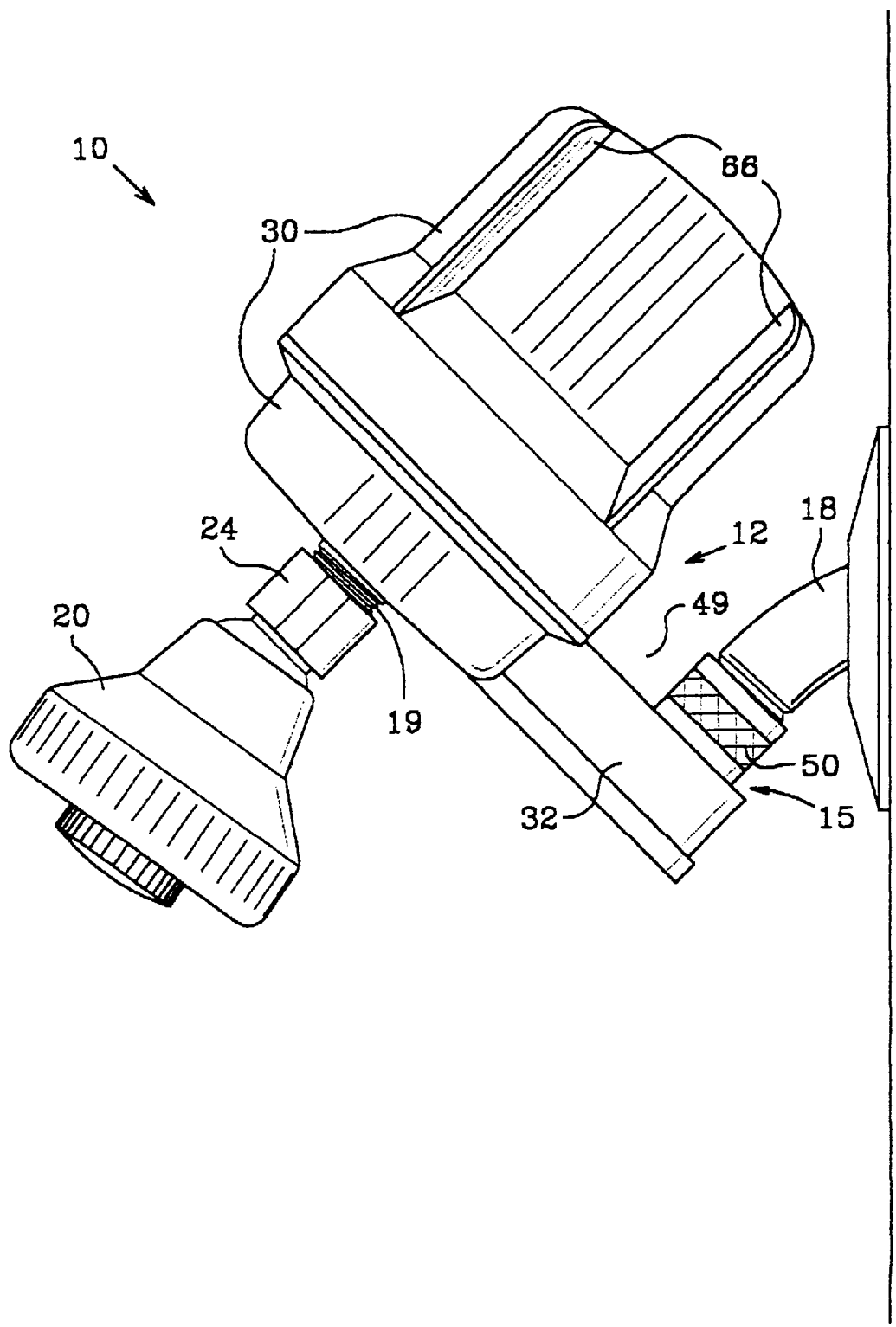
FIG. 1 is a side view of one embodiment of the invented shower filter unit, attached to a shower wall water pipe.
Figure 2:
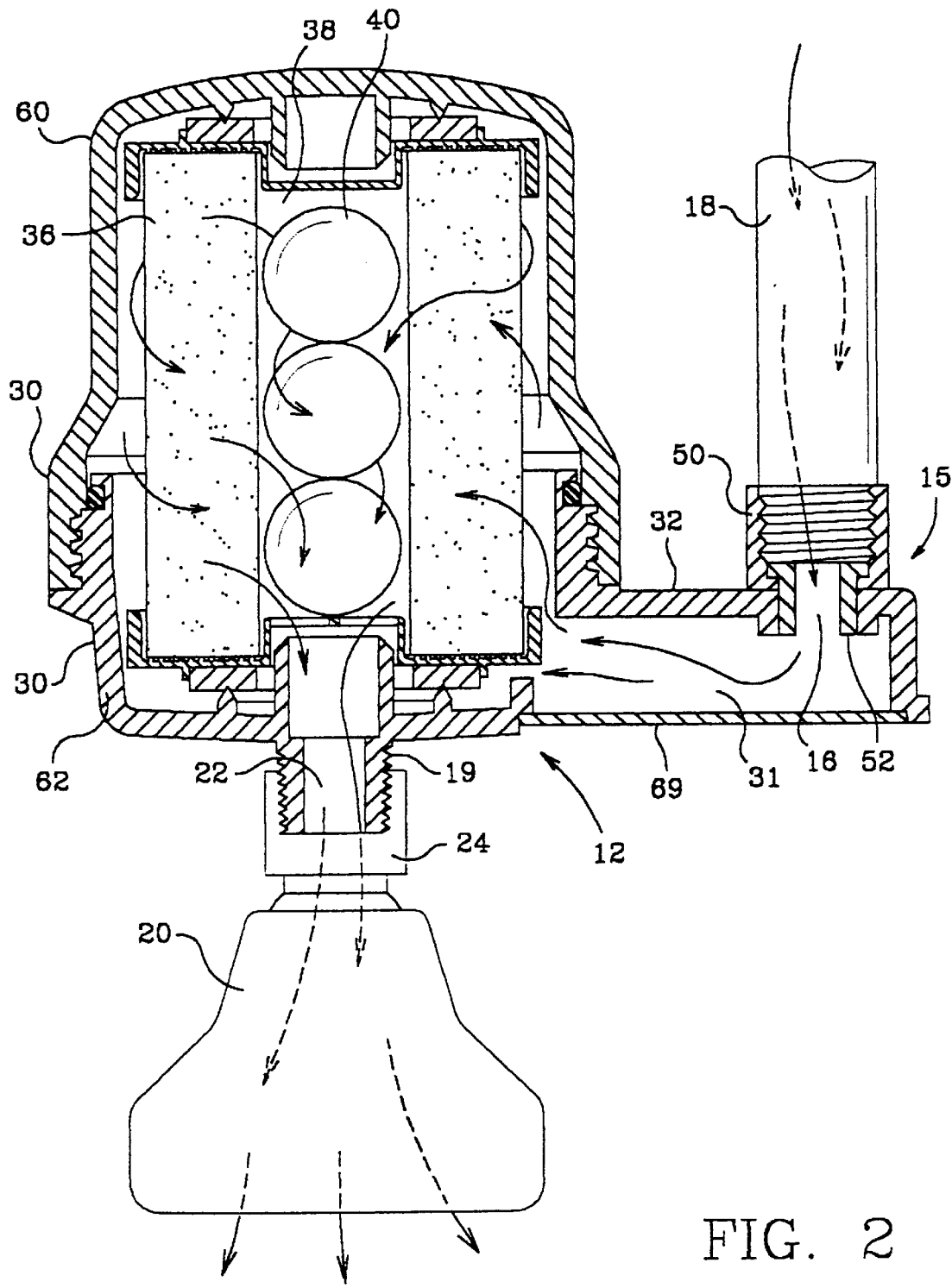
FIG. 2 is a cross-sectional view of the embodiment of FIG. 1, showing water flow through the filter unit.

Referring to the Figures, there is shown one, but not the only, embodiment of the invented shower filter unit 10. The shower filter unit 10, herein also called the "filter unit", comprises a housing 12 for containing and directing flow through a filter cartridge 14. As shown in FIG. 2, the housing 12 is connected at connector 15 around an inlet port 16 to the plumbing pipe 18 exiting the shower/tub wall, or alternatively, to a European-style shower configuration (not shown). The housing 12 is also connected to the showerhead 20 at the connector 19 of housing outlet port 22. Preferably, the inlet port 16 is securely and rigidly screwed onto the threads of pipe 18 and the connection is further sealed with Teflon™ or other pipe thread tape. The showerhead 20 is preferably connected to the housing 12 much as it would be in a conventional connection to a shower pipe, that it, with a swivel-collar style connection 24 that allows the showerhead 20 to be swivelled relative to the filter unit 10 to the position desired for comfortable use. As shown in FIG. 1, the shower filter unit 10 may be attached to the pipe 18 so that the filter unit 10 extends substantially up and outward from the end of the pipe 18. In this way, the body 30 of the housing is normally completely above the pipe end. This results in the showerhead 20, which extends downward from the housing body 30, terminating only a couple inches below the horizontal level that it normally would be if the filter unit 10 were absent. Also, the showerhead 20 is only a few inches forward from its normal position.

FIG. 2 illustrates the water flow through the filter unit 10. Water enters the inlet port 16 (normally at about 160° F.) and then flows through the interior space 31 of the housing arm 32 and into the interior space of the housing body 30, which holds the filter cartridge 14. The water flows around the exterior of the filter cartridge 14 in the annular space between the cartridge and the body wall, and then flows radially through the cylindrical carbon block 36 into the center core or "bore" 38 of the block 36. In the bore 38, the water contacts scale-inhibitor spheres 40 or other scale-inhibitor material received in the bore 38. After contact with the spheres 40, the water is directed through an opening at the bottom of the filter cartridge 14, that is, through the end cap 42 near the outlet port 22. Exiting the filter unit 10 through the outlet port 22, the water flows to the showerhead 20 and out to the user. Thus, as further explained below, the shower water may flow from its normal source (a pipe or faucet), through the filter unit 10, and out from its normal spraying device (a showerhead or hand-held sprayer).

Chlorine is removed from the shower/tub water by the cylinder-shaped carbon block 36, which may be manufactured by techniques known in the art of carbon block manufacture. Carbon blocks are superior to granular activated carbon for this use, because they can be made with a much greater surface area that the granular media. Carbon rapidly absorbs the chlorine from water, and, the greater the surface area of activated carbon, the greater its ability to absorb chlorine. Thus, carbon cannot be evaluated as a filter merely in terms of its weight or mass. Rather, its filtering ability is measured in terms of its surface area. The finest mesh size of granular media typically available is 20×50, which corresponds to a coarse powder. This is typically the practical limit to mesh size, because granular media of any finer mesh would literally float away in the air as it was being processed in granular form. This in turn could be a health hazard since, in this form, carbon would absorb oxygen, too. By contrast, the carbon processed into a carbon block can be ground down to particles as small as 80×325 and even 80×400 mesh. This exceptionally-fine mesh size can be used in carbon block manufacture to provide carbon block surface areas ten times that of 20×50-mesh carbon.

An important feature of the filter unit 10 is that it prevents scale from adhering to plumbing surfaces and wall and tile surfaces. This is accomplished by the presence of scale-inhibitor crystals made of a blend of hexametaphosphates and silicates in the form of the small spheres 40, just under one inch in diameter. When wet, these spheres 40 begin to give off the phosphate to "coat" the scale-forming minerals to prevent their deposition as "hard water scale". The spheres, preferably about 3–5 in number, typically last about six months in normal family use. To provide proper contact between the water and the spheres for dissolving them properly in the water, the spheres are placed inside the center core of the shower filter's cylindrical carbon block 36. As water enters the center core, it encounters the spheres and must flow around them to continue toward the showerhead. This contact between the de-chlorinated water and the phosphate spheres causes the phosphates to mix with the water and treat the scale content in the water. Thus, the effluent water is free of chlorine and the scale has been treated so that it will not stick to any surface. The phosphate sphere composition is hexametaphosphates and silicates, which may be obtained under the "Siliphos" brand name.

Figure 3:
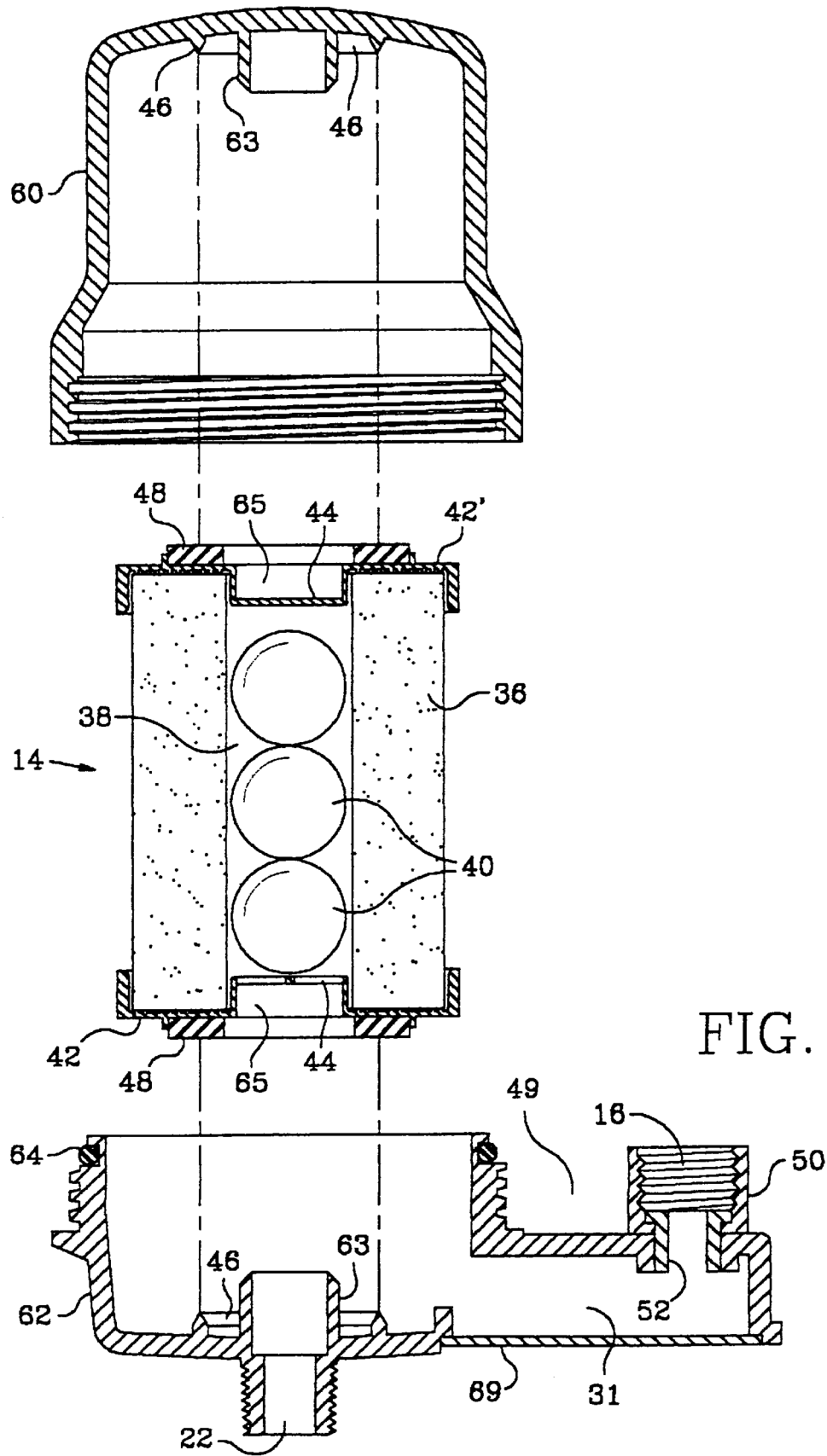
FIG. 3 is an expanded side view of the cross-sectional view of FIG. 2.
Figure 4:
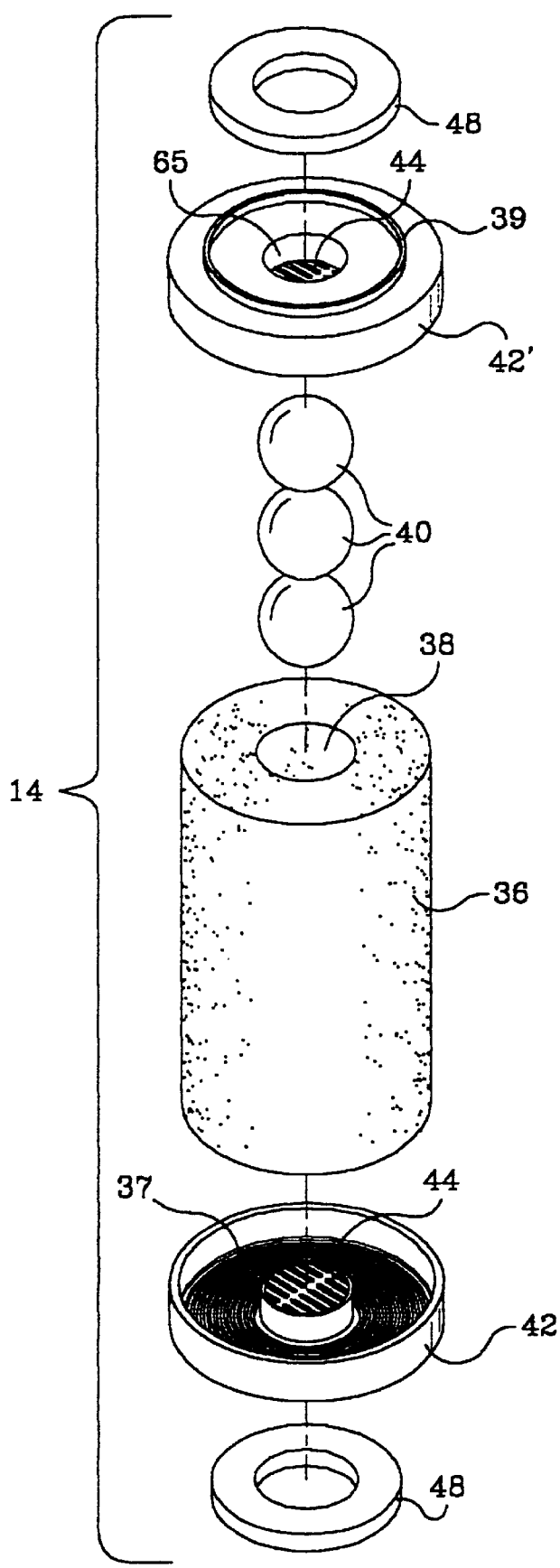
FIG. 4 is an expanded perspective view of the filter cartridge of the embodiment of FIG. 1.

The scale-inhibitor spheres 40 are contained in the center core (bore 38) of the carbon block cylinder by end caps 42, 42'. As shown to best advantage in FIGS. 3 and 4, the end caps 42, 42' of the filter cartridge 14 have grates 44 or other perforations that allow the water to flow through the end caps but that retain the scale-inhibitor spheres 40 in the bore 38. Water is prevented from bypassing the carbon block 36 and flowing directly into the center core of the block 36. The preferred bypass prevention is the positioning of circular protrusions, herein also called "knife edges" 46, which extend axially from each end of the housing body into the interior space of the body. Each knife edge 46 compresses into a soft rubber washer 48 affixed to the outer surface of an end cap, which washer rests inside retaining ring 39. Because the top of the filter cartridge provides no exit whatsoever, water entering the bore through the block 36 must travel down through the open grate 44 at the bottom of the filter cartridge. This same bottom grate prevents the scale-inhibitor spheres from falling out. Alternative locations for scale-inhibitor media may be included in the scope of this invention, but spheres captured inside a space in the carbon block are the preferred way of providing the scale-inhibiting feature.

End caps 42, 42' may include concentric ribs 37 for contacting and sealing with the carbon block 36.

Outside the United States, most bathrooms do not feature a plumbing fixture, located six feet from the floor, to which a showerhead is attached. Europeans and Asians, as well as most Canadians, prefer a hand-held showerhead device. The plumbing port for the hand-held device is located just under the bathroom tub's faucet. A long flexible tube is connected to this threaded port and runs vertically up to a bracket that is mounted on the shower wall approximately in the same place U.S. plumbing places its plumbing connection. This bracket is designed to hold a hand-held style showerhead. Thus, the European bather can use the showerhead in a hands-free style or can remove the showerhead from its bracket and rinse from various directions while holding the showerhead with one hand.

The ability to accommodate both U.S. and European-style shower accessory markets is important. Today, global distribution is becoming increasingly important as free trade zones are created and trade barriers are removed. Universality in the invented device is accomplished by making the arm 32 of the shower filter unit long enough to reach under the European-style bath faucet. The arm 32 is therefore preferably long enough to provide a space 49 between the inlet port 16 and the side of the housing body that is about 1–2 inches wide. A shorter arm 32 would be appropriate only for the U.S. market, but would cause the shower filter body to obstruct the reach of the arm for European-style tub faucets. By elongating the arm 32 beyond the minimum needed for the U.S. market, the filter unit 10 is adapted for use with both plumbing configurations without the need for other changes in the design of the filter unit.

The inlet port 16 and outlet port 22 may accommodate a variety of connectors, and may be easily adapted for variations in the threaded connections used in the U.S. and European-style shower/tub plumbing. Preferably, the filter unit 10 may be sold as a do-it-yourself kit, with the inlet port 16 and outlet port 22 threads formed at the time of molding or assembly for the particular market. Alternatively, adapters, couplers, or showerheads may be included in the kits to custom-fit the filter unit to the particular plumbing with little or no changes to the filter unit 10 itself.

In the U.S., the inlet port 16 preferably comprises a collar or nut 50 that rotates on a post 52 that is sonically welded or otherwise secured to the arm 32. During installation, the showerhead is removed from its normal place on the pipe 18, and the nut 50 is screwed onto the pipe 18 until the post's end meets and preferably seals with the pipe end. Thread tape may be used to further seal this connection. The swivel connector of the user's showerhead is then screwed onto the threaded male outlet port 22. Thus, the filter unit 10 is rigid and fixed relative to the pipe, but the showerhead may swivel relative to the filter unit.

In the European configuration, the inlet port is rigidly connected to the tub faucet. The flexible tubing for the hand-held unit, which normally would be attached to the bottom of the tub faucet, is instead attached to the bottom of the shower filter unit 10 at the outlet port. Variances in pipe threads between countries can be changed at the point of molding the shower filter unit. This may be accomplished by using an insert (in the case of the outlet port), or by changing the collar (in the case of the inlet port). It can also be converted using a brass coupler that changes one thread configuration to another.

The shower filter unit 10 accepts a replacement filter cartridge, and the user can easily replace the cartridge without assistance or tools. Each replacement filter cartridge is designed the same as the first cartridge supplied with the filter housing. The cartridge 14 is preferably symmetrically designed, with both ends having the end caps 42, 42' with grates and the washers 48 described above for cooperating with the knife-edges to control water flow. Thus, the filter cartridge may be installed with either end in either the upward or downward position, and filter cartridge seals the same way at either end. In this way, the user cannot install a replacement filter cartridge incorrectly, as it has no necessarily up or down end. Although alternative filter media configurations for removing chlorine and preventing scale are included in this invention, the preferred filter cartridge conveniently places the desirable media in a single, easily-handled unit.

The user installs the filter cartridge by removing the generally cylindrical upper portion 60 or "upper sump" of the housing body by unscrewing it from the lower portion 62 of the body. The filter cartridge is then removed and a fresh one is replaced in the body to be coaxial with the body, that is, the elongated cylindrical cartridge is aligned to be coaxial with the longitudinal axis of the body. Placement of the filter cartridge is made easy and sure, because guides 63 protrude from the interior surface of each end of the body and are received in the central recess 65 of each end cap. A dynamic O-ring 64 fits into a groove in the threads of the upper sump, and, in this position, does not come out easily even during the repeated detachment and re-attachment of the two portions of the housing body. This feature eliminates a common problem in sumps, that is, the O-ring falls out or worse, it comes loose and then is destroyed when the sump is screwed back into place. This O-ring design makes it nearly impossible for the user to inadvertently dislodge and destroy the O-ring.

The expansion and contraction of the filter housing with hot water will, over time, cause the threads to become difficult to rotate, making it difficult to remove the sump for filter cartridge change-outs. To solve this problem, the invented design incorporates four wings 66 spaced radially around the outside of the sump. These protruding wings make the sump easy to grasp and to rotate during filter changes, thereby eliminating the need for a special tool.

Flow rate is an important issue in the global distribution of water filters because different geographic regions are accustomed to water pressures which range from 20 PSI to 125 PSI. In the United States and Japan, for example, water pressure can be very high. In Mexico and most of Asian, the water pressure is lower. To accommodate these differing water pressures, the mesh size of the powdered carbon can be changed according to the desired result. A finer mesh size will inhibit the passage of water by causing higher pressure-drop. A coarser mesh size will allow water to flow more easily. To provide appropriate filter cartridges for the various water pressures, this invented filter design may include changing the mesh size of the raw carbon powder in the manufacture of the block. Each gradation is color-coded so that one color can be designated for high pressure (80 to 125), medium pressure (40 to 80), and low pressure (15 to 40).

The preferred filter housing is made of molded plastic, preferably ABS, or other durable material. The arm may include a separately-molded plastic lid 69. This lid 69 may be sonically welded or otherwise sealed to the arm to enclose the arm interior space. The inlet port nut 50 may be metal or plastic, as may be other connectors or couplers that may be desirable for adaptation to various plumbing designs. Conventional techniques may be used for attaching the various components of the invention together, for example, sonic welding, press-fitting, and threading to connect the housing components together or adhesive to connect the filter cartridge components together.

Although this invention has been described above with reference to particular means, materials and embodiments, it is to be understood that the invention is not limited to these disclosed particulars, but extends instead to all equivalents within the scope of the following claims.

I claim:

1. A filter unit for attachment to a bathroom water source and for use with a filter cartridge and a spraying device, the filter unit comprising: and having a housing having a body with an interior space a symmetrical bi-directional filter cartridge, arranged in a vertical orientation and having an upper end and a lower end;

the housing further having a generally horizontal arm extending from near the lower end of the body, said arm having a top surface and a bottom surface;

the housing further having an arm interior space in fluid communication with the body interior space;

the housing further having an inlet port through the arm top surface in fluid communication with the arm interior space, wherein the housing inlet port is adapted for attachment to the bathroom water source, so that the housing is located substantially above the water source; and said housing further having an outlet port through the body lower end in fluid communication with the interior space of the body, wherein the housing outlet port is adapted for attachment to a spraying device.

2. The filter unit as in claim 1, wherein the body is generally cylindrical and has a longitudinal axis, and the outlet port is located coaxially with the body.

3. The filter unit as in claim 1, wherein the inlet port extends upwardly from the arm and is generally parallel to the body.

4. The filter unit as in claim 3, wherein the inlet port is located between about 1–2 inches from the housing body.

5. A filter unit for attachment to a bathroom water source and for use with a filter cartridge and a spraying device, the filter unit comprising:

a housing having a body with an interior space for receiving a filter cartridge and having an upper end and a lower end;

a symmetrical, bi-directional, vertically oriented filter cartridge received in the housing body interior space, the filter cartridge comprising a carbon block for removal of chlorine from the water and a scale inhibitor media for treating scale-forming components in the water;

the housing further having a generally horizontal arm extending from near the lower end of the body, said arm having a top surface and a bottom surface;

the horizontal arm further having an arm interior space in fluid communication with the body interior space;

the housing further having an inlet port through the arm top surface in fluid communication with the arm interior space, wherein the housing inlet port is adapted for attachment to the bathroom water source so that the housing is located substantially above the water source; and said housing further having an outlet port through the body lower end in fluid communication with the interior space of the body, wherein the housing outlet port is adapted for attachment to a spraying device.

6. The filter unit as in claim 5, wherein the filter cartridge carbon block is generally cylindrical and has a central bore for receiving the scale inhibitor media.

7. The filter unit as in claim 6, wherein the scale-inhibitor media comprises hexametaphosphate/silicate spheres.

8. The filter unit as in claim 6, wherein the filter cartridge has two ends and has an end cap attached to each of said ends extending across said central bore for retaining said scale-inhibiting media in said central bore, and wherein said end caps have perforations for allowing water flow through the end caps.

9. The filter unit as in claim 8, wherein the body has a top and bottom inner surface and one or more circular protrusions extending from the top and bottom inner surfaces and sealing with the end caps.

10. The filter unit as in claim 9, wherein each of the end caps comprises a resilient washer for contacting and sealing with the circular protrusions.

11. The filter unit as in claim 6, wherein the body has an inner surface and a vertical longitudinal axis and the filter cartridge is coaxially received in the body interior space, wherein the filter cartridge comprises two end caps attached to the carbon block and extending across the central bore for retaining the scale-inhibitor media, both end caps further sealing to the body inner surface for preventing water flow from bypassing the carbon block.

12. A symmetrical bidirectional filter cartridge for use with a bathroom water source, the filter cartridge comprising a carbon filter media and a scale-inhibiting media scale-inhibitor media, the scale-inhibitor media adapted to coat scale-forming minerals when wet.

13. The filter cartridge as in claim 12, wherein the carbon filter media comprises a carbon block.

14. The filter cartridge as in claim 13, wherein the carbon block has a central space for receiving the scale-inhibitor media.

15. The filter cartridge as in claim 13, wherein the carbon block is generally cylindrical and has a central space for receiving the scale-inhibitor media.

16. The filter cartridge as in claim 13, wherein the carbon block is color-coded to indicate carbon mesh size for indicating the water pressure range for which the carbon block is designed.

17. The filter cartridge as in claim 12, wherein the scale-inhibitor media comprises hexametaphosphate/silicate spheres.

* * * * *